(12) United States Patent
Cecchin

(10) Patent No.: US 7,111,331 B2
(45) Date of Patent: Sep. 26, 2006

(54) METHOD OF MOLDING A TOILET SEAT ASSEMBLY

(75) Inventor: Euclide Cecchin, Windsor (CA)

(73) Assignee: Talhin/T Corporation, Oldcastle (CA)

( * ) Notice: Subject to any disclaimer, the term of this patent is extended or adjusted under 35 U.S.C. 154(b) by 156 days.

(21) Appl. No.: 10/837,921

(22) Filed: May 3, 2004

(65) Prior Publication Data

US 2004/0205883 A1 Oct. 21, 2004

Related U.S. Application Data

(60) Division of application No. 10/422,889, filed on Apr. 24, 2003, now Pat. No. 6,748,611, which is a continuation-in-part of application No. 10/037,828, filed on Jan. 3, 2002, now abandoned.

(51) Int. Cl.
*A47K 13/00* (2006.01)

(52) U.S. Cl. .................. 4/234; 4/239; 4/240; 4/236; 4/237

(58) Field of Classification Search ............... 4/237, 4/239, 240, 234, 236, 242.1; 264/328.8, 264/255
See application file for complete search history.

(56) References Cited

U.S. PATENT DOCUMENTS

| 749,083 | A | 1/1904 | McElroy |
|---|---|---|---|
| 848,043 | A | 3/1907 | McCord et al. |
| 1,290,611 | A | 1/1919 | Lussier |
| 2,047,480 | A | 7/1936 | MacDonald |
| 2,155,286 | A | 4/1939 | Winding |
| 2,185,169 | A | 12/1939 | Romanoff |
| 3,331,085 | A | 7/1967 | Potosky |
| 3,517,396 | A | 6/1970 | Wert |
| 3,623,931 | A * | 11/1971 | Van Hosen ............ 4/234 |
| 3,671,981 | A | 6/1972 | Smith |
| 3,863,277 | A | 2/1975 | Harrison |
| 3,988,789 | A | 11/1976 | Blount |
| 4,318,213 | A | 3/1982 | Blount |
| 4,440,377 | A * | 4/1984 | Hujik ............ 249/119 |
| 5,192,809 | A | 3/1993 | Jones et al. |
| 5,209,968 | A | 5/1993 | Sweeney |
| 5,648,431 | A | 7/1997 | Demuth et al. |
| 5,791,103 | A | 8/1998 | Coolman et al. |
| 5,991,935 | A | 11/1999 | Wang |
| 6,154,892 | A | 12/2000 | Hogue |
| 6,640,349 | B1 * | 11/2003 | Toldo et al. ............ 4/237 |

FOREIGN PATENT DOCUMENTS

| DE | 19730330 A1 * | 1/1999 |
|---|---|---|
| EP | 673743 A1 * | 9/1995 |
| GB | 2221930 | 2/1990 |
| JP | 2001225353 A * | 8/2001 |
| JP | 2002088212 | 3/2002 |

* cited by examiner

*Primary Examiner*—Khoa D. Huynh
(74) *Attorney, Agent, or Firm*—Howard and Howard Attorneys

(57) ABSTRACT

A toilet seat assembly 10 includes a toilet seat 12 having a seat skin 14 defining the exterior surfaces thereof and a seat core 16 disposed within and surrounded by the seat skin 14 and a cover 18 having a cover skin 20 defining the exterior surfaces thereof and a cover core 22 disposed within and surrounded by the cover skin 20. The assembly is characterized by the cores 16, 22 each comprising a waste material. The waste material may be a single polymer wasted in the process of making other products. Alternatively or in combination therewith, combining a plurality of different materials (including different polymers) from different sources may be employed to formulate the waste material.

6 Claims, 2 Drawing Sheets

METHOD OF MOLDING A TOILET SEAT ASSEMBLY

RELATED APPLICATIONS

This application is a divisional of application Ser. No. 10/422,889 which was filed Apr. 24, 2003 now U.S. Pat. No. 6,748,611 which is a Continuation-In-Part of application Ser. No. 10/037,828 which was filed on Jan. 3, 2002 now abandoned.

BACKGROUND OF THE INVENTION

1. Field of the Invention

The subject invention relates to a toilet seat assembly including a seat and a cover and, more specifically, to molded toilet seat assemblies.

2. Description of the Prior Art

Toilet seat assemblies include a seat and cover coupled together by a hinge mechanism that also connects the assembly to a toilet. These toilet seat assemblies have been fabricated from materials such as wood and plastic, some with a solid core surrounded by polymer material. Examples of such prior art techniques are disclosed in the U.S. Pat. Nos. 3,863,277 to Harrison; 3,988,789 to Blount; U.S. Pat. No. 5,991,935 to Wang and 6,154,892 to Hogue.

In all prior systems there has been the continuing objective to reduce the cost of fabricating the toilet seat assemblies.

SUMMARY OF THE INVENTION AND ADVANTAGES

It is, therefore, an object of the subject invention to produce a toilet seat assembly at a reduced cost. This is accomplished by a method of molding a toilet seat and cover comprising the steps of forming a seat having a seat core surrounded by a seat skin, and forming a cover having a cover core surrounded by a cover skin. The method is characterized by forming the cores of a waste material suspended in a carrier.

The waste material may be collected from the processes for making other products and mixed into a flowable material that solidifies into the cores. By accumulating and using such waste materials, the cost of the assembly is greatly reduced.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
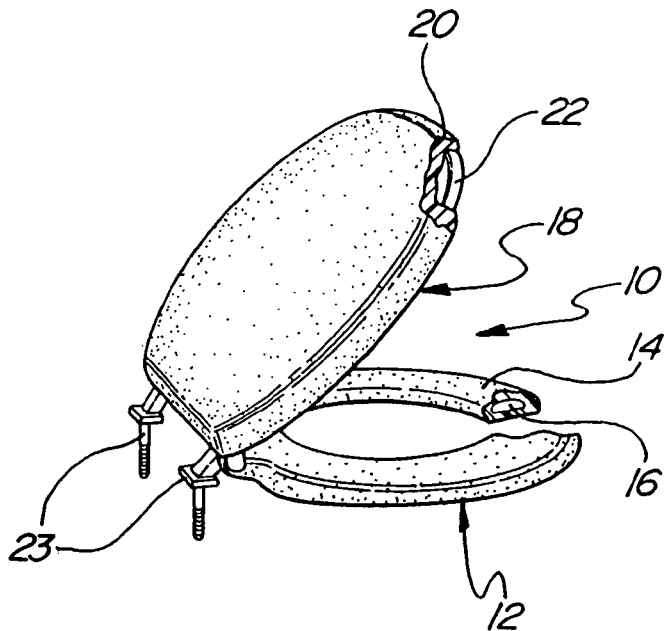
FIG. 1 is a perspective view of a toilet seat assembly formed in accordance with the subject invention.

Referring to the Figures, wherein like numerals indicate like or corresponding parts throughout the several views, a toilet seat assembly fabricated in accordance with the subject invention is generally shown at 10 in FIG. 1. The toilet seat assembly 10 includes a toilet seat, generally indicated at 12, having a seat skin 14 defining the exterior surfaces thereof and a seat core 16 disposed within and surrounded by the seat skin 14. The assembly 10 similarly includes a cover, generally indicated at 18, including a cover skin 20 defining the exterior surfaces thereof and a cover core 22 disposed within and surrounded by the cover skin 20. Appropriate and well known hardware 23 hingedly interconnect the seat 12 and cover 18 and mount the assembly 10 on a water closet or toilet.

The assembly is characterized by the cores 16, 22 each comprising a waste material. The waste material may be a single polymer wasted in the process of making other products. Alternatively or in combination therewith, combining a plurality of different materials (including different polymers) from different sources may be employed to formulate the waste material.

Figure 2:
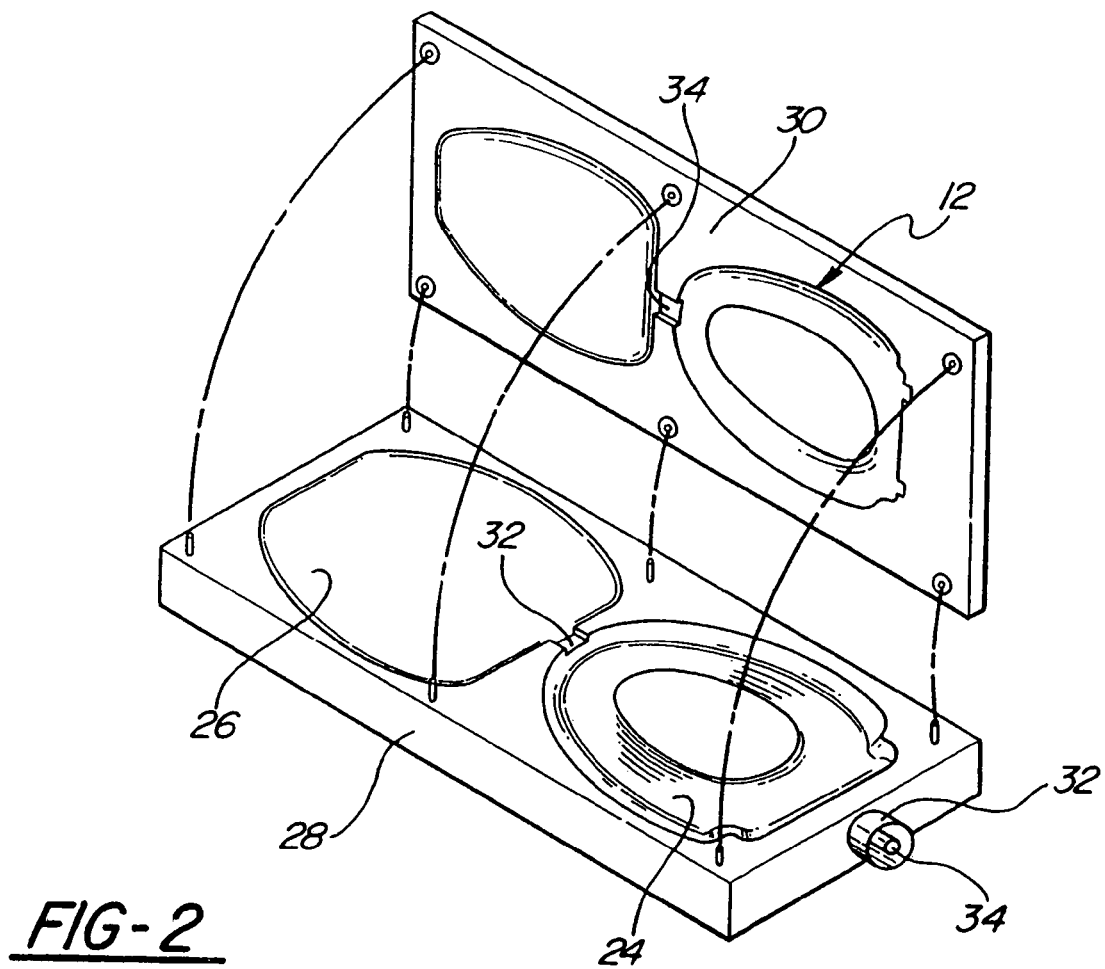
FIG. 2 is a mold for molding the toilet seat assembly of he subject invention.

The method of fabricating the toilet seat 12 and the cover 18 comprises the known steps of forming the seat 12 having a seat core 16 surrounded by a seat skin 14 and forming the cover 18 having a cover core 22 surrounded by a cover skin 20, but is characterized by forming the cores 16, 22 of a waste material. As illustrated in FIG. 2, this may be accomplished by simultaneously injecting the polymer for the seat skin 14 into a seat mold cavity 24 and into a cover mold cavity 26, both of which are defined by a mold comprising the mold bottom 28 and mold top 30. Although the top 30 is shown perpendicular to the bottom 28, the two parts are disposed in parallel planes when in use and are opened and closed in the manner well known in the art. The seat 12 and cover 18 molding the seat 12 and cover 18 are molded in the same mold 28, 30 having an interconnecting gate defined by grooves 32 and 34 in the respective mold halves 28 and 30 and interconnecting the seat and cover mold cavities 24 and 26.

Figure 3:
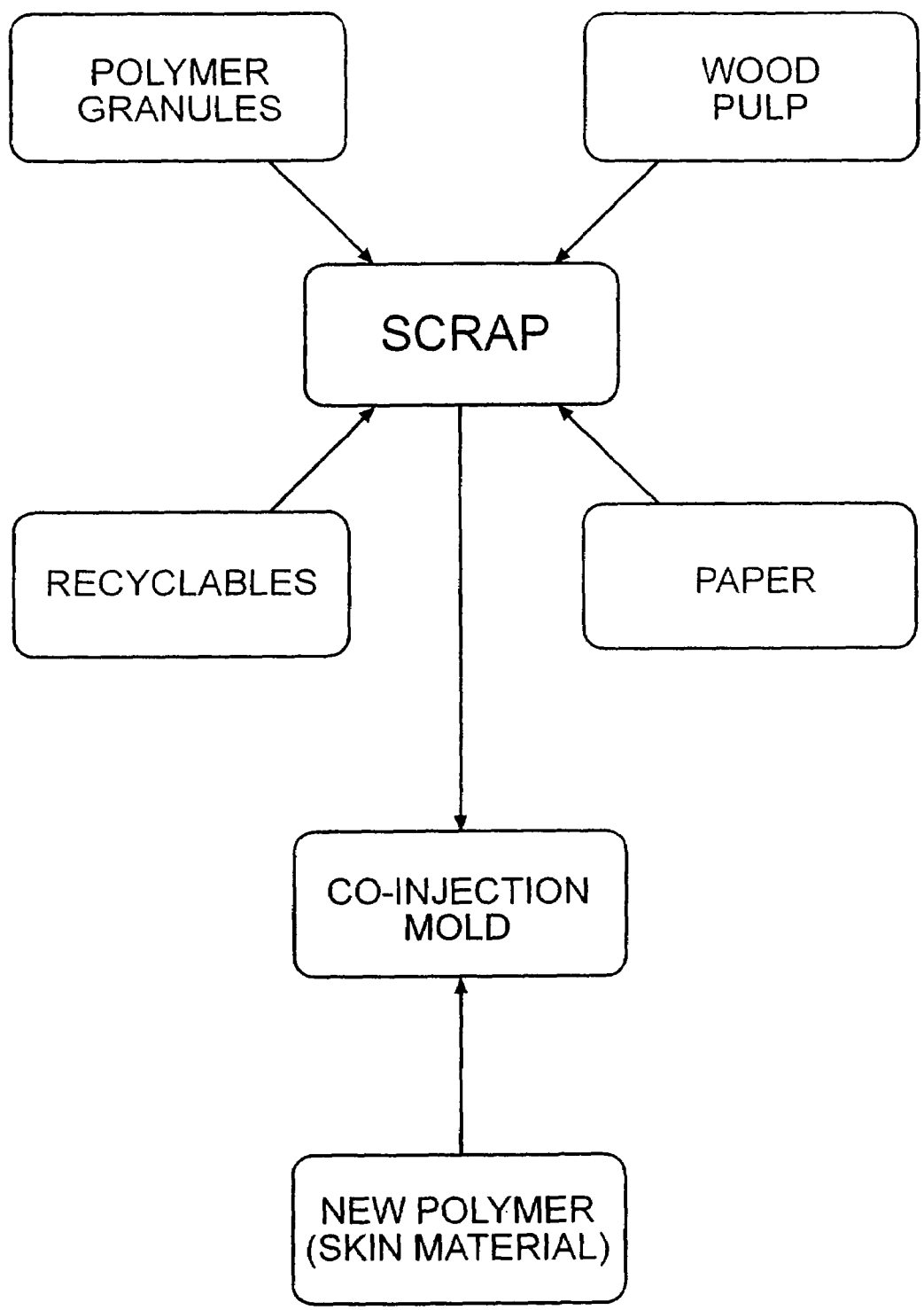
FIG. 3 is a schematic view of the method of the subject invention.

The method is perfected by injecting a waste material into the seat mold cavity 24 and into the cover mold cavity 26 to fill the skin polymer. Actually, the polymer material for the skin is co-injected with the waste material into the mold cavities 24, 26. This may be accomplished by injecting the waste material in a tube 34 concentrically within a cylinder 32 of the skin polymer, i.e., a jet within a jet. A plurality of such injectors may be disposed about the mold halve 28. The waste material could include a mixture of waste polymers from different sources, such as other injection processes making other parts. Often products molded from polymers have imperfections and must be discarded. These discarded scarp products can be ground up into granules that can be mixed with granules from other scrap products to provide the waste material. In other words, the method may be further defined as collecting solidified polymers from molding processes for products other than toilet seat assemblies, dividing the solidified polymers into a granular mix, heating the granular mix into a flowable mix, and injecting a waste material including the flowable mix. In some cases the waste material may include particles of wood. As shown in FIG. 3, the waste may also include recyclable materials, or even paper.

As alluded to above, the waste or recycled material may include a mixture of a polymer and particles of other waste products having different physical characteristics (e.g., melting temperature) such as wood (sawdust) shredded carpet, etc. It has been found important that the main recycled or waste material be mixed with a sufficient volume of carrier material, such as the polymer having the requisite flow characteristics. In other words, the waste material is suspended in a carrier material and injected into the mold cavity to form the core. The carrier is in the range of 10 to 30 percent by volume of the core, i.e., the waste material is 10 to 90 percent by volume of the core material. In the case of sawdust the ratio is 70% sawdust and 30% polymer, whereas shredded carpet is 90% shredded carpet and 10% polymer. The waste material occupies a majority of the volume of the core and the carrier material occupies a minority of the volume of the core. Preferably, the carrier is a polymer which enhances the flow of the core material, i.e., renders the flow characteristics of the core closer to that of the skin than the flow characteristics of the waste material per se.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method of molding a toilet seat (12) and cover (18) comprising the steps of;

injecting a skin polymer into a seat mold cavity (24) and into a cover mold cavity (26), and injecting a core material into the seat mold cavity (24) and into the cover mold cavity (26) to fill the skin polymer by suspending a waste material in a carrier with the waste material occupying a majority of the core material by volume and the carrier occupying a minority of the core material by volume.

2. A method as set forth in claim 1 wherein the carrier is further defined as a polymer carrier.

3. A method as set forth in claim 2 wherein the waste material is further defined as including at least one of particles of wood, sawdust, shredded carpet, and shredded paper suspended in the polymer carrier.

4. A method as set forth in claim 1 wherein the step of suspending the waste material is further defined as collecting solidified polymers in a granular mix, heating the granular mix into a flowable mix, and injecting the waste material into the flowable mix to define the core material.

5. A method as set forth in claim 1 including the step of molding the seat (12) and cover (18) in the same mold having a gate (32, 34) interconnecting the seat and cover mold cavities.

6. A method as set forth in claim 1 wherein the waste material is further defined as including at least one of particles of wood, sawdust, shredded carpet, or shredded paper suspended in the carrier.

* * * * *